United States Patent
Lee et al.

(10) Patent No.: US 8,766,938 B2
(45) Date of Patent: Jul. 1, 2014

(54) SIGNAL PROCESSING METHOD OF A TOUCH PANEL

(75) Inventors: Ping-Hwan Lee, Hsin-Chu (TW); Yu-Min Hsu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 415 days.

(21) Appl. No.: 13/300,669

(22) Filed: Nov. 21, 2011

(65) Prior Publication Data

US 2013/0063370 A1 Mar. 14, 2013

(30) Foreign Application Priority Data

Sep. 14, 2011 (TW) .............................. 100133036 A

(51) Int. Cl.
*G06F 3/041* (2006.01)
(52) U.S. Cl.
USPC ......................................................... 345/173
(58) Field of Classification Search
None
See application file for complete search history.

(56) References Cited

U.S. PATENT DOCUMENTS

| 2010/0079397 A1* | 4/2010 | Yang et al. | 345/173 |
| 2010/0177199 A1 | 7/2010 | Chen | |
| 2013/0002579 A1* | 1/2013 | Hatano | 345/173 |
| 2013/0063390 A1* | 3/2013 | Kwon et al. | 345/174 |
| 2013/0321327 A1* | 12/2013 | Lee et al. | 345/174 |

* cited by examiner

*Primary Examiner* — Seokyun Moon
(74) *Attorney, Agent, or Firm* — Winston Hsu; Scott Margo

(57) ABSTRACT

A signal processing method is employed to operate a touch panel having a first touch sensing unit and plural second touch sensing units adjacent to the first touch sensing unit. In the operation of the method, a first signal is generated through amplifying the first sensing signal of the first touch sensing unit by N times with N equal to the number of the second touch sensing units, a second signal is generated through summing up the second sensing signals of the second touch sensing unit, a difference signal is generated through subtracting the second signal from the first signal, a comparison result is generated through comparing the difference signal with a difference threshold, and finally the comparison result is utilized for judging whether a touch event is occurring to the first touch sensing unit.

13 Claims, 4 Drawing Sheets

| SUa1 (SSa1) | SUa2 (SSa2) | SUa3 (SSa3) |
|---|---|---|
| SUa4 (SSa4) | SUc (SSc) | SUa5 (SSa5) |
| SUa6 (SSa6) | SUa7 (SSa7) | SUa8 (SSa8) |

FIG. 1 RELATED ART

SIGNAL PROCESSING METHOD OF A TOUCH PANEL

BACKGROUND OF THE INVENTION

1. Technical Field

The disclosure relates to a signal processing method, and more particularly, to a signal processing method for use in a touch panel.

2. Description of the Prior Art

Flat panel displays (FPDs) have advantages of a thin profile, low power consumption, and low radiation, and are broadly adopted for application in a variety of electronic appliances such as media players, mobile phones, personal digital assistants (PDAs), and computer monitors, etc. Besides, along with the requirement of a friendly communication interface for a user to interact with an electronic device, a touch-sensitive display device for controlling operations of the electronic device, instead of using a keyboard or a mouse, has steadily become the mainstream.

In general, the touch-sensitive display device may employ a resistive touch panel or a capacitive touch panel to sense touch input. The resistive touch panel locates touch input positions through voltage drops, but is unable to provide multitouch input functionality. The capacitive touch panel typically includes sensing capacitors, and performs signal processing on capacitance variations of the sensing capacitors corresponding to touch points for locating touch input positions, which is able to provide multitouch input functionality, thereby gaining increasing popularity.

In view of that, the flat panel display having touch sensing mechanism normally includes a display panel and a capacitive touch panel attached thereon. The operation of the capacitive touch panel may be performed based on a sensing judge array 100 illustrated in FIG. 1 so as to provide a means of ascertaining the occurrence of a touch event corresponding to the sensing judge array 100. As shown in FIG. 1, the sensing judge array 100 is a 3×3 array having a first touch sensing unit SUc and a plurality of second touch sensing units SUa1~SUa8 adjacent to the first touch sensing unit SUc. The first touch sensing unit SUc is employed to output a first sensing signal SSc, and the second touch sensing units SUa1~SUa8 are employed to output plural second sensing signals SSa1~SSa8 respectively. A signal processing method applied to the sensing judge array 100 may comprise calculating an average of the second sensing signals SSa1~SSa8, summing up the average and a preset first threshold value for generating a second threshold value, and comparing the first sensing signal SSc with the second threshold value for judging whether a touch event is occurring to the first touch sensing unit SUc.

However, the aforementioned operation of calculating the average of the second sensing signals SSa1~SSa8 tends to incur a reduction of signal processing accuracy. Besides, while the display panel is performing an image data writing operation, the sensing operation of the capacitive touch panel may be seriously interfered by noise-like electric field generated in the polarity alternating process of writing high-voltage pixel signals, which may cause the capacitive touch panel to output error sensing signals. In particular, as a heavy touch event is occurring to the capacitive touch panel, the interference of noise-like electric field within a heavy touch influencing area becomes much more serious, such that the operation of the signal processing method is more likely to misjudge touch events over error sensing signals, thereby resulting in malfunction of backend circuit. Finally, if the first threshold value is increased for avoiding an occurrence of misjudging touch events, the operation of the signal processing method may be unable to detect a soft touch event.

SUMMARY

It is therefore a primary objective of the present invention to provide a signal processing method for use in a touch panel having a first touch sensing unit and a plurality of second touch sensing units adjacent to the first touch sensing unit with the aim of improving signal processing accuracy and solving the prior art problems.

In accordance with an embodiment of the present invention, the signal processing method comprises generating a first signal through amplifying a first sensing signal of the first touch sensing unit by N times with N equal to a number of the second touch sensing units; generating a second signal through summing up plural second sensing signals of the second touch sensing units; generating a difference signal through subtracting the second signal from the first signal; comparing the difference signal with a first difference threshold for generating a first comparison result; and judging whether a touch event is occurring to the first touch sensing unit according to the first comparison result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 illustrates a sensing judge array for use in a touch panel to detect a touch event.

DETAILED DESCRIPTION

Hereinafter, some embodiments of the present invention will be described in detail with reference to the accompanying drawings. Here, it is to be noted that the present invention is not limited thereto. Furthermore, the step serial numbers regarding the signal processing method of a touch panel are not meant thereto limit the operating sequence, and any rearrangement of the operating sequence for achieving same functionality is still within the spirit and scope of the invention.

Figure 2:
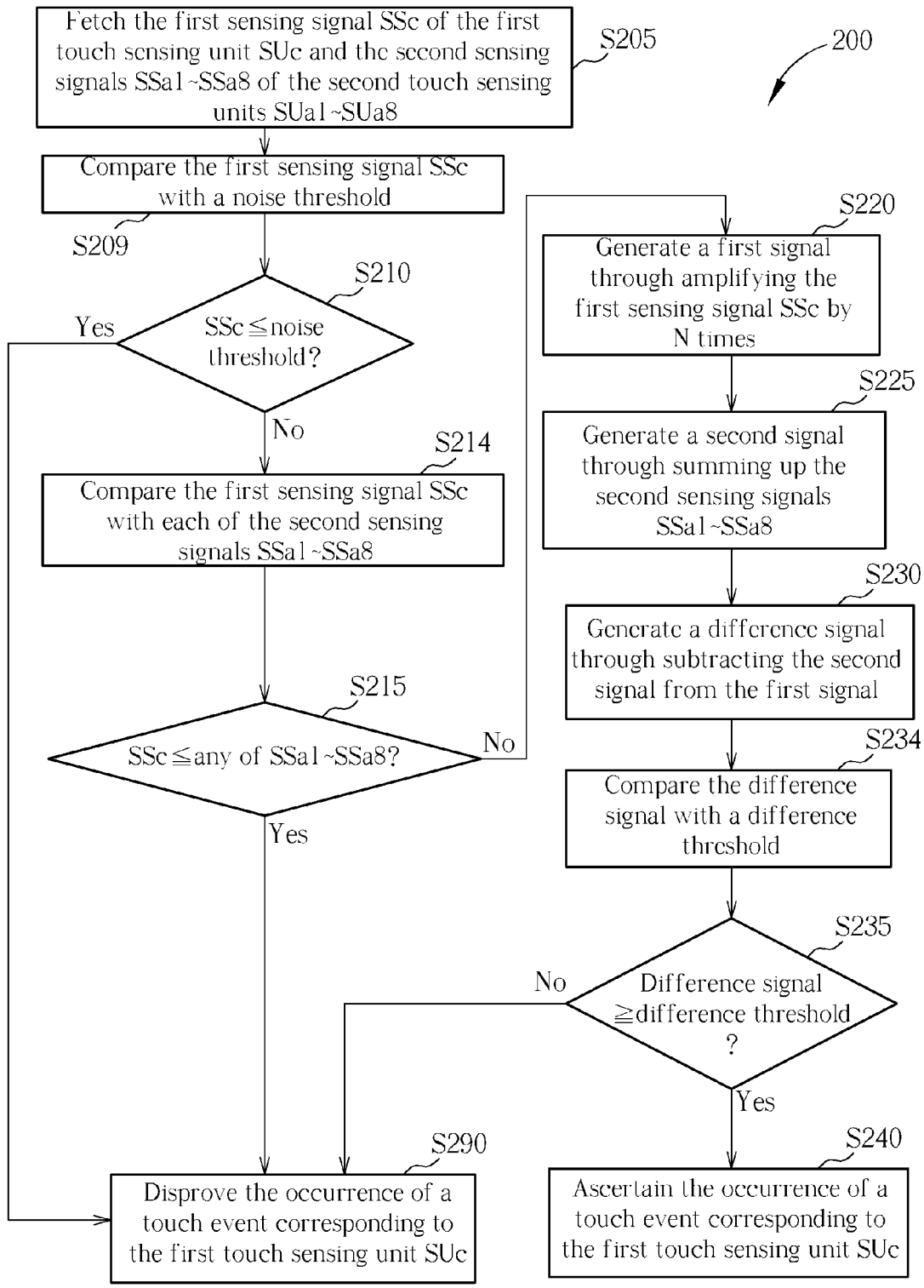
FIG. 2 is a flowchart depicting a signal processing method based on the sensing judge array illustrated in FIG. 1 according to a first embodiment of the present invention.

FIG. 2 is a flowchart depicting a signal processing method based on the sensing judge array 100 illustrated in FIG. 1 according to a first embodiment of the present invention. As shown in FIG. 2, the flow 200 for depicting the signal processing method of a touch panel comprises the following steps:

Step S205: fetching the first sensing signal SSc of the first touch sensing unit SUc, and fetching the second sensing signals SSa1~SSa8 of the second touch sensing units SUa1~SUa8 adjacent to the first touch sensing unit SUc;

Step S209: comparing the first sensing signal SSc with a noise threshold for generating a first preliminary comparison result;

Step S210: judging whether the first sensing signal SSc is not greater than the noise threshold according to the first preliminary comparison result, if the first sensing signal SSc is not greater than the noise threshold, go to step S290; otherwise, go to step S214;

Step S214: comparing the first sensing signal SSc with each of the second sensing signals SSa1~SSa8 for generating a second preliminary comparison result;

Step S215: judging whether the first sensing signal SSc is not greater than any of the second sensing signals SSa1~SSa8 according to the second preliminary comparison result, if the first sensing signal SSc is not greater than one of the second sensing signals SSa1~SSa8, go to step S290; otherwise, go to step S220;

Step S220: generating a first signal through amplifying the first sensing signal SSc by N times with N equal to the number of the second touch sensing units SUa1~SUa8;

Step S225: generating a second signal through summing up the second sensing signals SSa1~SSa8;

Step S230: generating a difference signal through subtracting the second signal from the first signal;

Step S234: comparing the difference signal with a difference threshold for generating a comparison result;

Step S235: judging whether the difference signal is not less than the difference threshold according to the comparison result, if the difference signal is not less than the difference threshold, go to step S240; otherwise, go to step S290;

Step S240: ascertaining the occurrence of a touch event corresponding to the first touch sensing unit SUc; and Step S290: disproving the occurrence of a touch event corresponding to the first touch sensing unit SUc.

In the flow 200 of the signal processing method based on the sensing judge array 100 of the touch panel, the number of the second touch sensing units SUa1~SUa8 adjacent to the first touch sensing unit SUc is 8, and therefore N is equal to 8. In one embodiment, the signal processing method may be performed only based on the second touch sensing units SUa2, SUa4, SUa5 and SUa7, and N is then equal to 4. In another embodiment, the sensing judge array for detecting a touch event may be a 5×5 array, and N may be equal to or less than 24. It is noted that, without the requirement of performing an average calculating operation, the flow 200 of the signal processing method is able to avoid a reduction of signal processing accuracy.

Figure 3:
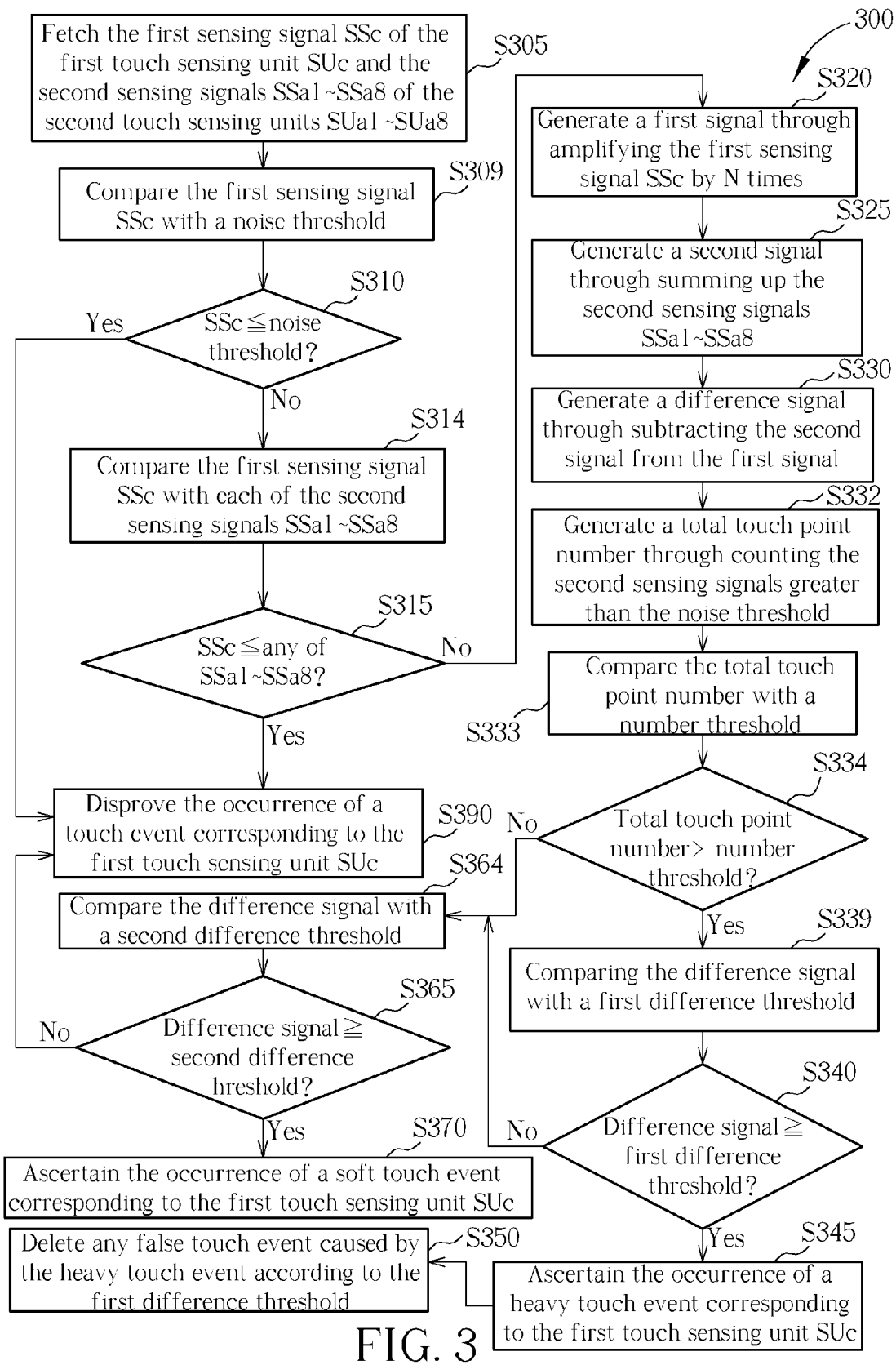
FIG. 3 is a flowchart depicting a signal processing method based on the sensing judge array illustrated in FIG. 1 according to a second embodiment of the present invention.

FIG. 3 is a flowchart depicting a signal processing method based on the sensing judge array 100 illustrated in FIG. 1 according to a second embodiment of the present invention. As shown in FIG. 3, the flow 300 for depicting the signal processing method of a touch panel comprises the following steps:

Step S305: fetching the first sensing signal SSc of the first touch sensing unit SUc, and fetching the second sensing signals SSa1~SSa8 of the second touch sensing units SUa1~SUa8 adjacent to the first touch sensing unit SUc;

Step S309: comparing the first sensing signal SSc with a noise threshold for generating a first preliminary comparison result;

Step S310: judging whether the first sensing signal SSc is not greater than the noise threshold according to the first preliminary comparison result, if the first sensing signal SSc is not greater than the noise threshold, go to step S390; otherwise, go to step S314;

Step S314: comparing the first sensing signal SSc with each of the second sensing signals SSa1~SSa8 for generating a second preliminary comparison result;

Step S315: judging whether the first sensing signal SSc is not greater than any of the second sensing signals SSa1~SSa8 according to the second preliminary comparison result, if the first sensing signal SSc is not greater than one of the second sensing signals SSa1~SSa8, go to step S390; otherwise, go to step S320;

Step S320: generating a first signal through amplifying the first sensing signal SSc by N times with N equal to the number of the second touch sensing units SUa1~SUa8;

Step S325: generating a second signal through summing up the second sensing signals SSa1~SSa8;

Step S330: generating a difference signal through subtracting the second signal from the first signal;

Step S332: generating a total touch point number through counting the second sensing signals greater than the noise threshold;

Step S333: comparing the total touch point number with a number threshold for generating a third comparison result;

Step S334: judging whether the total touch point number is greater than the number threshold according to the third comparison result, if the total touch point number is greater than the number threshold, go to step S339; otherwise, go to step S364;

Step S339: comparing the difference signal with a first difference threshold for generating a first comparison result;

Step S340: judging whether the difference signal is not less than the first difference threshold according to the first comparison result, if the difference signal is not less than the first difference threshold, go to step S345; otherwise, go to step S364;

Step S345: ascertaining the occurrence of a heavy touch event corresponding to the first touch sensing unit SUc;

Step S350: deleting any false touch event caused by the heavy touch event according to the first difference threshold;

Step S364: comparing the difference signal with a second difference threshold for generating a second comparison result;

Step S365: judging whether the difference signal is not less than the second difference threshold according to the second comparison result, if the difference signal is not less than the second difference threshold, go to step S370; otherwise, go to step S390;

Step S370: ascertaining the occurrence of a soft touch event corresponding to the first touch sensing unit SUc; and Step S390: disproving the occurrence of a touch event corresponding to the first touch sensing unit SUc.

In the flow 300 of the signal processing method based on the sensing judge array 100 of the touch panel, the second difference threshold is less than the first difference threshold. Similarly, without the requirement of performing an average calculating operation, the flow 300 of the signal processing method is able to avoid a reduction of signal processing accuracy. Besides, by making use of the judging operations corresponding to the number threshold, the first difference threshold and the second difference threshold, each touch event can be further identified as one heavy touch event or one soft touch event. And while ascertaining the occurrence of a heavy touch event, any false touch event caused by the noise-like electrical field within a heavy touch influencing area can be deleted for enhancing touch detecting reliability. It is noted that, if a real touch event occurs during one judge cycle of touch detecting operation over the touch panel, whether the real touch event is a heavy touch event can be determined with the aid of judging operations corresponding to the total touch point number and the first difference threshold, and the false touch event caused by the heavy touch event is deleted according to the first difference threshold. The step 350 of deleting any false touch event caused by the heavy touch event according to the first difference threshold may comprise setting a heavy touch influencing area centered at the first touch sensing unit SUc according to the magnitude of the first difference threshold and deleting any soft touch event (construed as false touch event) detected within the heavy touch influencing area. It is also noted that the corresponding difference signal of the first sensing signal SSc of each soft touch event being deleted within the heavy touch influencing area is less than the first difference threshold.

Figure 4:
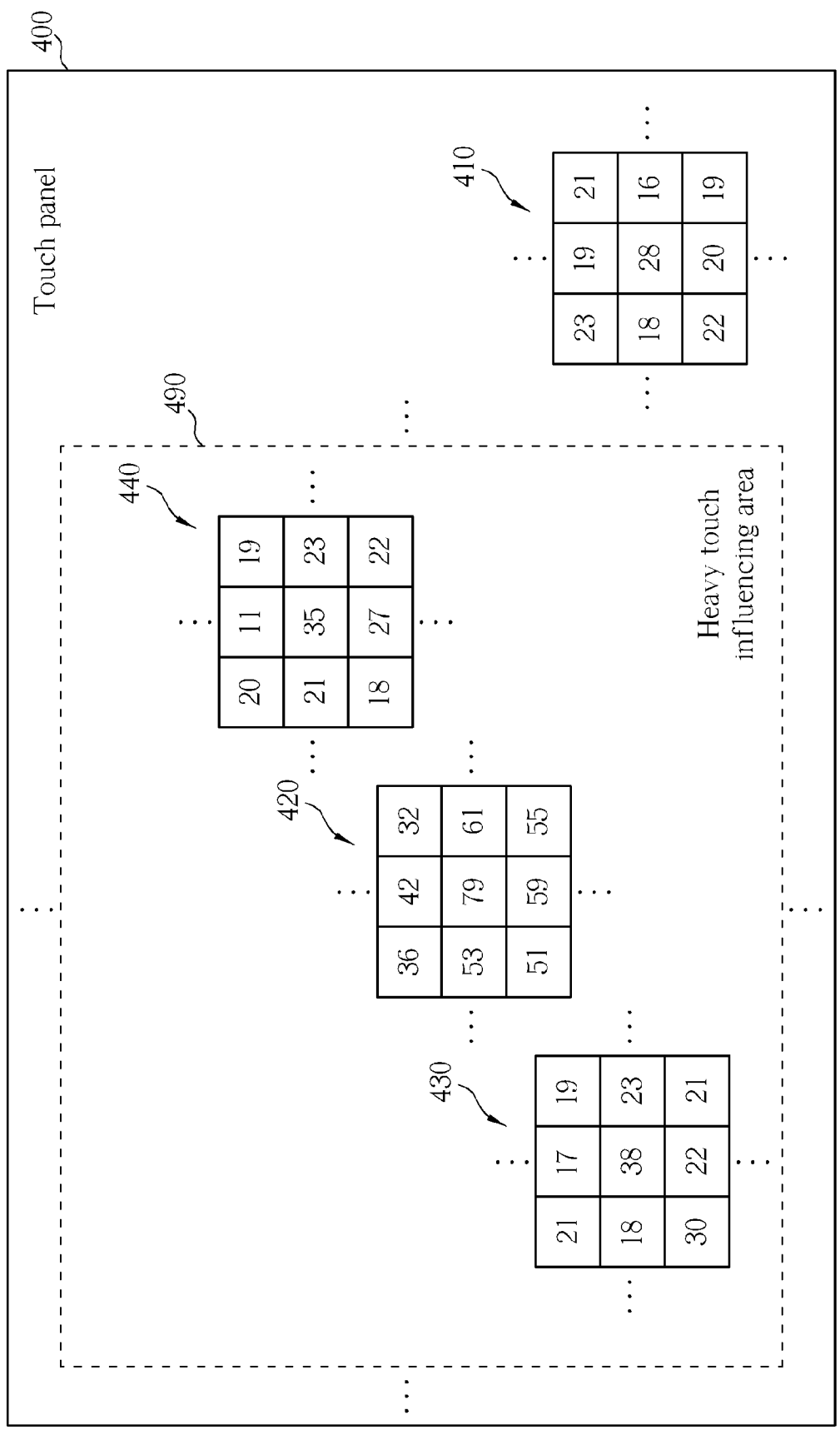
FIG. 4 is a schematic diagram demonstrating the operation of a touch panel based on the sensing judge array illustrated in FIG. 1 by applying the signal processing method shown in FIG. 3.

FIG. 4 is a schematic diagram demonstrating the operation of a touch panel 400 based on the sensing judge array 100 illustrated in FIG. 1 by applying the signal processing method shown in FIG. 3. As shown in FIG. 4, the touch panel 400 comprises a plurality of sensing judge arrays 410~440. In the exemplary operation of the touch panel 400 shown in FIG. 4, the noise threshold is set to be 20, the first difference threshold is set to be 200, the second difference threshold is set to be 50, and the number threshold is set to be 6. Regarding the sensing judge array 410, the first sensing signal SSc(28) is greater than the noise threshold (20) and is also greater than each of the second sensing signals SSa1~SSa8(≤23), the total touch point number (3) is less than the number threshold (6), and the difference signal (66) is between the first difference threshold (200) and the second difference threshold (50). In view of that, the occurrence of a soft touch event corresponding to the first touch sensing unit SUc of the sensing judge array 410 is ascertained. Similarly, the occurrence of two soft touch events corresponding to the first touch sensing units SUc of the sensing judge arrays 430 and 440 can also be ascertained.

Regarding the sensing judge array 420, the first sensing signal SSc(79) is greater than the noise threshold (20) and is also greater than each of the second sensing signals SSa1~SSa8(≤61), the total touch point number (8) is greater than the number threshold (6), and the difference signal (243) is greater than the first difference threshold (200). In view of that, the occurrence of a heavy touch event corresponding to the first touch sensing unit SUc of the sensing judge array 420 is ascertained. Further, a heavy touch influencing area 490 centered at the sensing judge array 420 is set according to the first difference threshold (200), and any soft touch event (construed as false touch event) within the heavy touch influencing area 490 is deleted, i.e. deleting the soft touch events corresponding to the sensing judge arrays 430 and 440.

Summarizing the above, without the requirement of performing an average calculating operation, the signal processing method of a touch panel according to present invention is able to avoid a reduction of signal processing accuracy. Besides, by making use of the judging operations corresponding to a number threshold and two difference thresholds, each touch event can be further identified as one heavy touch event or one soft touch event. Also, while ascertaining the occurrence of a heavy touch event, any false touch event caused by the noise-like electrical field within a heavy touch influencing area is deleted, thereby enhancing touch detecting reliability.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A signal processing method of a touch panel, the touch panel comprising a first touch sensing unit and a plurality of second touch sensing units adjacent to the first touch sensing unit, the signal processing method comprising:
    generating a first signal through amplifying a first sensing signal of the first touch sensing unit by N times with N equal to a number of the second touch sensing units;
    generating a second signal through summing up plural second sensing signals of the second touch sensing units;
    generating a difference signal through subtracting the second signal from the first signal;
    comparing the difference signal with a first difference threshold for generating a first comparison result; and
    judging whether a touch event is occurring to the first touch sensing unit according to the first comparison result.

2. The signal processing method of claim 1, wherein the step of judging whether the touch event is occurring to the first touch sensing unit according to the first comparison result comprises:
    ascertaining an occurrence of the touch event corresponding to the first touch sensing unit if the difference signal is not less than the first difference threshold.

3. The signal processing method of claim 1, wherein the step of judging whether the touch event is occurring to the first touch sensing unit according to the first comparison result comprises:
    disproving an occurrence of the touch event corresponding to the first touch sensing unit if the difference signal is not greater than the first difference threshold.

4. The signal processing method of claim 1, wherein the step of judging whether the touch event is occurring to the first touch sensing unit according to the first comparison result comprises:
    comparing the difference signal with a second difference threshold less than the first difference threshold for generating a second comparison result if the difference signal is not greater than the first difference threshold; and
    judging whether the touch event is occurring to the first touch sensing unit according to the second comparison result.

5. The signal processing method of claim 4, wherein the step of judging whether the touch event is occurring to the first touch sensing unit according to the second comparison result comprises:
    disproving an occurrence of the touch event corresponding to the first touch sensing unit if the difference signal is not greater than the second difference threshold.

6. The signal processing method of claim 1, further comprising:
    comparing the first sensing signal with a noise threshold; and
    disproving an occurrence of the touch event corresponding to the first touch sensing unit if the first sensing signal is not greater than the noise threshold.

7. The signal processing method of claim 6, wherein the step of comparing the first sensing signal with the noise threshold is performed prior to generating the first signal through amplifying the first sensing signal of the first touch sensing unit by N times.

8. The signal processing method of claim 1, further comprising:
- comparing the first sensing signal with each of the second sensing signals; and
- disproving an occurrence of the touch event corresponding to the first touch sensing unit if the first sensing signal is not greater than one of the second sensing signals.

9. The signal processing method of claim 8, wherein the step of comparing the first sensing signal with each of the second sensing signals is performed prior to generating the first signal through amplifying the first sensing signal of the first touch sensing unit by N times.

10. The signal processing method of claim 1, further comprising:
- generating a total touch point number through counting the second sensing signals greater than a noise threshold; and
- comparing the total touch point number with a number threshold for generating a third comparison result.

11. The signal processing method of claim 10, wherein the step of judging whether the touch event is occurring to the first touch sensing unit according to the first comparison result comprises:
- judging whether the touch event is occurring to the first touch sensing unit according to the first and third comparison results.

12. The signal processing method of claim 10, wherein the step of comparing the total touch point number with the number threshold for generating the third comparison result is performed prior to comparing the difference signal with the first difference threshold for generating the first comparison result.

13. The signal processing method of claim 10, wherein the step of comparing the total touch point number with the number threshold for generating the third comparison result is performed after generating the difference signal through subtracting the second signal from the first signal.

* * * * *